(12) United States Patent
Yamazaki et al.

(10) Patent No.: US 6,822,828 B2
(45) Date of Patent: Nov. 23, 2004

(54) MAGNETIC HEAD

(75) Inventors: Masahiko Yamazaki, Miyagi (JP); Yoshihiko Inoue, Miyagi (JP)

(73) Assignee: Sony Corporation, Tokyo (JP)

( * ) Notice: Subject to any disclaimer, the term of this patent is extended or adjusted under 35 U.S.C. 154(b) by 105 days.

(21) Appl. No.: 09/907,225

(22) Filed: Jul. 17, 2001

(65) Prior Publication Data
US 2002/0015258 A1 Feb. 7, 2002

(30) Foreign Application Priority Data
Jul. 31, 2000 (JP) .................................... P2000-235281

(51) Int. Cl.⁷ .............................................. G11B 5/127
(52) U.S. Cl. ..................................... 360/125; 360/122
(58) Field of Search ................................. 360/125, 122

(56) References Cited

U.S. PATENT DOCUMENTS

| 4,788,611 | A | * | 11/1988 | Kobayashi et al. | ......... 360/120 |
| 5,136,775 | A | * | 8/1992 | Onoe et al. | ............. 29/603.12 |
| 5,162,960 | A | * | 11/1992 | Sakata et al. | ................ 360/126 |
| 5,245,488 | A | * | 9/1993 | Iwamoto et al. | .............. 360/19 |
| 5,566,442 | A | * | 10/1996 | Gaud et al. | ............... 29/603.14 |
| 5,726,842 | A | * | 3/1998 | Mori et al. | .................. 360/126 |

FOREIGN PATENT DOCUMENTS

JP          08153308 A  *  6/1996  ............ G11B/5/23

* cited by examiner

Primary Examiner—A. J. Heinz
Assistant Examiner—Mark Blouin
(74) Attorney, Agent, or Firm—Sonnenschein, Nath & Rosenthal LLP

(57) ABSTRACT

The present invention discloses a magnetic head which allows smooth filling of a non-magnetic material such as glass, and can prevent bubbles from generating within the such non-magnetic material, which comprises a slide-contact plane with which a magnetic recording medium comes into contact, which is provided on a magnetic core; a magnetic gap provided in the slide-contact plane by forming thereon at least a magnetic film; a groove portion provided at one end or each of both ends of the magnetic gap so as to be aligned approximately in parallel to a moving direction of the magnetic recording medium; and a non-magnetic material provided in the groove portion, wherein the groove portion has a non-magnetic oxide film and a chromium film formed on an inner surface thereof and has the non-magnetic material formed on the chromium film so as to fill the groove portion.

4 Claims, 13 Drawing Sheets

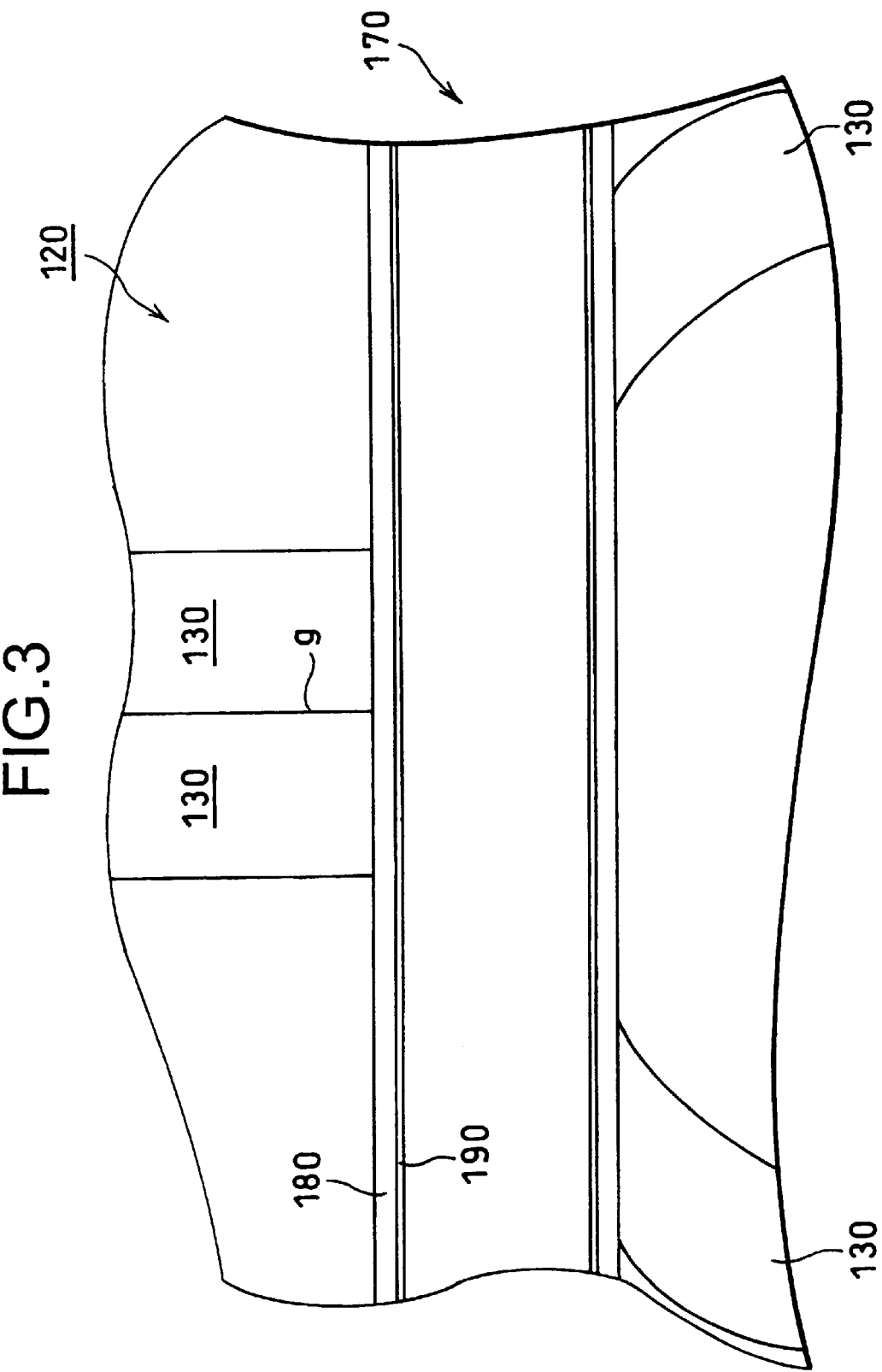

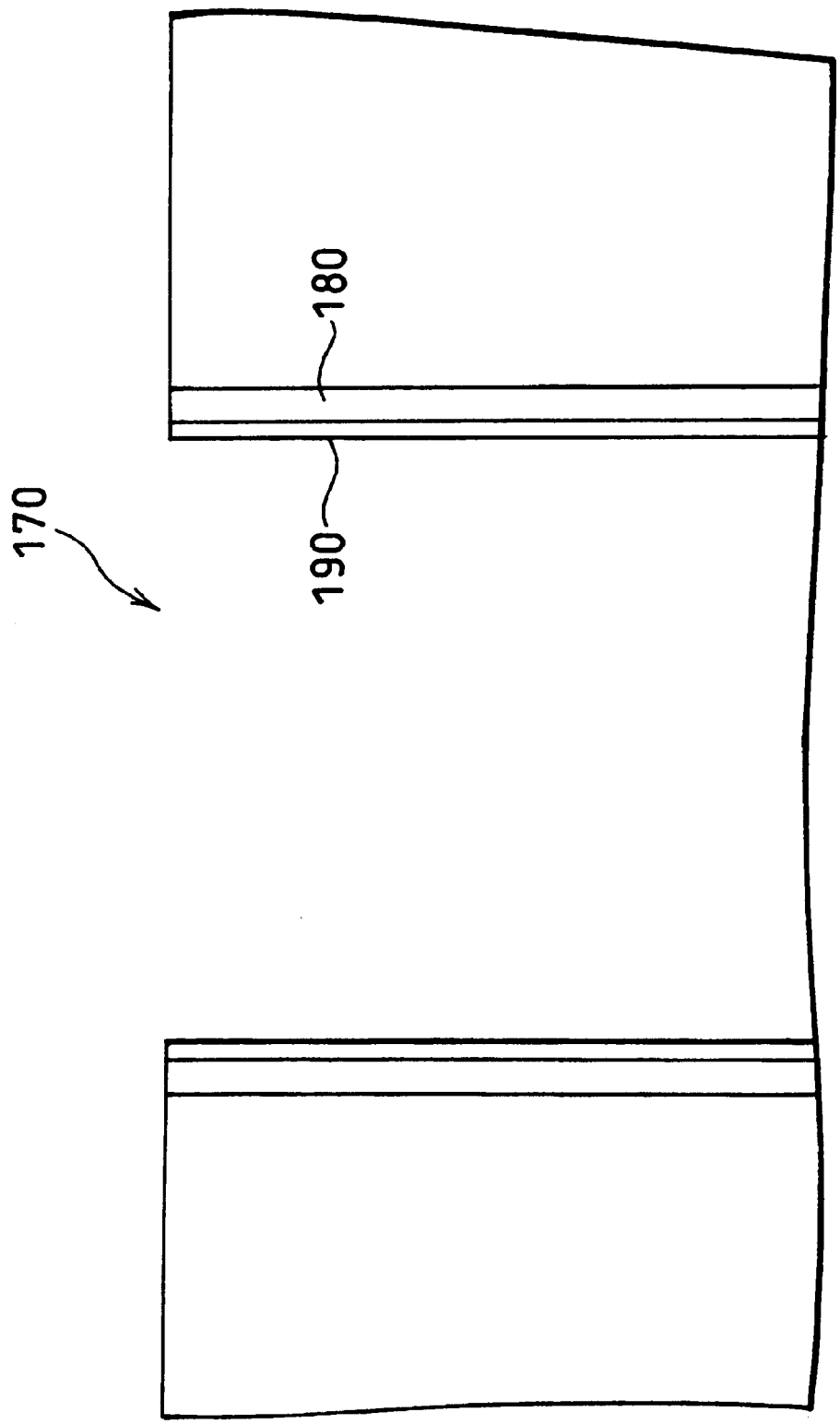

MAGNETIC HEAD

CROSS REFERENCES TO RELATED APPLICATIONS

The present document is based on Japanese Priority Document JP 2000-235281, filed in the Japanese Patent Office on Jul. 31, 2000, and amended on Dec. 26, 2000, the entire contents of which being incorporated herein by reference.

BACKGROUND OF THE INVENTION

1. Field of the Invention

The present invention relates to a magnetic head for recording and reproducing an audio signal, a video signal, or an information signal such as a data signal to or from a magnetic recording medium.

2. Description of the Related Art

A typical conventional video tape recorder (VTR), a digital audio tape recorder (DAT) or a digital data recording-reproducing device using a magnetic tape or the like as a magnetic recording medium has a magnetic head for writing information signals in a magnetic signal form into recording tracks on such magnetic tape, or for reading recorded information signals in a magnetic signal form from the recording tracks.

Such magnetic head generally has a magnetic core composed of two magnetic core halves joined with each other, and such magnetic core is processed to have a slide-contact plane with which a magnetic tape comes into contact.

The slide-contact plane has a magnetic gap embedded therein, and such magnetic gap is formed by joining two magnetic core halves while being interposed with a magnetic film or a gap material.

The magnetic gap is responsible for limiting the extending range of the magnetic field on the magnetic tape during recording, and for introducing magnetic flux from the magnetic tape during reproduction.

A specific constitution of such magnetic head is shown in FIG. 12. A magnetic head 10 comprises a magnetic core halves 11a and 11b. The magnetic core halves 11a, 11b have metal magnetic thin films 12a and 12b fabricated therein to thereby complete a magnetic circuit. Joining such magnetic core halves 11a and 11b, individually having the metal magnetic thin films 12a and 12b formed thereon, while providing a gap material therebetween will produce a magnetic gap g.

Sliding motion of a magnetic tape across the magnetic gap g allows recording and reproduction of information signals between such magnetic tape and the magnetic head 10.

The upper end and the lower end of the magnetic gap g along the vertical direction in FIG. 12 are referred to as "edges", where misalignment or sagging of the joined metal magnetic thin films 12a, 12b may occur. Such misalignment or sagging of the metal magnetic thin films 12a, 12b will produce unnecessary leakage magnetic field from the edges of the magnetic gap g, which undesirably disturbs recording patterns on the magnetic tape moving on the slide-contact plane of the magnetic head 10.

This raises a tough problem in particular for the case that the recording system of information signals is based on the overwrite system as shown in FIG. 13, since S/N ratio in the recording tends to be degraded due to so-called side-erasing effect, which prevents all recording tracks on the magnetic tape from being effectively used.

To avoid such problem, a groove 33 is formed, as shown in FIG. 12, on the lower edge side of the magnetic gap g of the magnetic head 10, which is corresponded with the overwriting side, so as to prevent the misalignment or sagging at the edge of the magnetic gap g on the side responsible for the overwriting.

The groove 33 is filled with a glass 33a. This successfully prevents clogging of the groove 33 with the magnetic powder dropped from the magnetic tape, or chipping of the edge of the magnetic gap g, which ensures stable running of the magnetic tape.

Filling the glass 33a into the groove 33 of the magnetic head 10, however, tends to generate bubbles entrained in such glass 33a in the vicinity of the metal magnetic films 12a and 12b and along the magnetic core halves 11a and 11b. Such bubbles entrained in the glass 33a will undesirably catch the magnetic powder to be clogged during the tape run.

Oxygen plasma cleaning or block annealing of the groove 33 under an oxygen atmosphere before being filled with the glass 33a was only partially effective in reducing such bubbles entrained along the magnetic core halves 11a and 11b, and was not effective at all in reducing those along the metal magnetic films 12a and 12b, which makes it difficult to bring the magnetic head 10 into mass production.

Considering the above, it is therefore an object of the present invention to provide a magnetic head which allows simple filling of a non-magnetic material such as glass, and allows suppression of the bubble generation within such non-magnetic material.

SUMMARY OF THE INVENTION

The present invention provides a magnetic head comprising a slide-contact plane with which a magnetic recording medium comes into contact, which is provided on a magnetic core; a magnetic gap provided in the slide-contact plane by forming thereon at least a magnetic film; a groove portion provided at one end or each of both ends of the magnetic gap so as to be aligned approximately in parallel to a moving direction of the magnetic recording medium; and a non-magnetic material provided in the groove portion; wherein the groove portion has a non-magnetic oxide film and a chromium film formed on an inner surface thereof and has the non-magnetic material formed on such chromium (Cr) film so as to fill the groove portion.

In an embodiment, the groove portion has on the inner surface thereof a non-magnetic oxide film which can prevent the non-magnetic material and the magnetic film from reacting with each other and thus can prevent the bubbles from being generated within such non-magnetic material. The non-magnetic oxide film is further covered with the chromium (Cr) film. The bubble generation is also caused by rare gas which are once occluded in the non-magnetic oxide film during the formation thereof typically by sputtering into the groove portions, and then released into the non-magnetic material during filling thereof due to elevated temperature. The chromium (Cr) film can block such release of the rare gas.

In an embodiment, the non-magnetic material is a glass, and the filling of such glass is carried out under a nitrogen (N2) atmosphere added with oxygen.

Using a highly weatherproof glass is preferable for ensuring reliability of the magnetic head, but has been disadvantageous in that filling of such highly weatherproof glass into the groove portion requires heating typically at 540° C. or above. This is because such glass can flow to thereby successfully fill the groove portion only when heated to such high temperature region.

Raising the temperature of such highly weatherproof glass to 540° C. or above, however, produces deposition within the glass, so that it has actually been difficult to use the highly weatherproof glass in the groove portion.

In an embodiment, the non-magnetic material is a highly weatherproof glass which is filled under a nitrogen atmosphere added with oxygen, which improves wettability of the glass and thus allows the glass to flow smoothly into the groove portion to thereby fill thereof even at a relatively low temperature. Such low temperature is not causative of the deposition within the glass.

Hence the highly weatherproof glass, which has been unavailable previously, can be filled in the groove portion to thereby improve the reliability of the magnetic head.

In an embodiment, the non-magnetic oxide film has a thickness of 0.1 μm or above, and the chromium film has a thickness of 0.01 to 0.1 μm. According to the constitution of claim 3, the non-magnetic oxide film as thick as 0.1 μm or above can completely prevent the reaction between the highly weatherproof glass and the magnetic film, which successfully prevents the highly weatherproof glass from generating the bubbles.

The chromium film has a thickness of 0.01 to 0.1 μm. The thickness of 0.01 μm or above is preferred since a thickness less than such value may result in corrosion of the chromium film through the reaction with the highly weatherproof glass. On the other hand, the thickness exceeding 0.1 μm will lower the transparency of the chromium film and may ruin the confirmability therethrough, so that the depth control of the magnetic gap may become difficult. Thus the thickness is preferably 0.1 μm or below.

In an embodiment, the magnetic film is a nitrogen-doped magnetic alloy film.

In an embodiment, the magnetic film is a nitrogen-doped magnetic alloy film. Such nitrogen-doped magnetic alloy film is formed typically by sputtering under supply of at least nitrogen gas (N2), so that the film tends to release nitrogen gas (N2) when the highly weatherproof glass is filled into the groove portion at a predetermined temperature, and such nitrogen gas released into the highly weatherproof glass will be causative of the bubbles. In this embodiment, the bubbles can more effectively be prevented from generating even when the nitrogen-doped magnetic alloy film is specifically used as the magnetic film, since the non-magnetic oxide film and the chromium (Cr) film are formed on the inner surface of the groove portion.

In an embodiment, a magnetic head comprising a slide-contact plane with which a magnetic recording medium comes into contact, which is provided on a magnetic core; a magnetic gap provided in the slide-contact plane by forming thereon at least a magnetic film; a groove portion provided at one end or each of both ends of the magnetic gap so as to be aligned approximately in parallel to a moving direction of the magnetic recording medium; and a non-magnetic material provided in the groove portion; wherein the groove portion has a chromium oxide film formed on an inner surface thereof and has the non-magnetic material formed on such chromium oxide film so as to fill the groove portion.

In embodiment, the chromium oxide film is formed on the inner surface of the groove portion and the non-magnetic material is filled thereon, which successfully prevents the reaction between the non-magnetic material and the magnetic film, to thereby avoid the bubble generation within the non-magnetic material.

In an embodiment, the chromium oxide film has a thickness of 0.1 μm or above.

In an embodiment, the chromium oxide film has a thickness of 0.1 μm or above, which completely prevents the reaction between the non-magnetic material and the magnetic film to thereby completely prevent the bubble generation within the non-magnetic material.

In an embodiment, the magnetic film is a nitrogen-doped magnetic alloy film.

In an embodiment, the magnetic film is a nitrogen-doped magnetic alloy film. Such nitrogen-doped magnetic alloy film is formed typically by sputtering under supply of at least nitrogen gas (N2), so that the film tends to release nitrogen gas (N2) when the highly weatherproof glass is filled into the groove portion at a predetermined temperature, and such nitrogen gas released into the highly weatherproof glass will be causative of the bubbles. In this embodiment, the bubbles can more effectively be prevented from generating even when the nitrogen-doped magnetic alloy film is specifically used as the magnetic film, since the chromium oxide film is formed on the inner surface of the groove portion. As is clear from the above, the present invention can provide a magnetic head which allows simple filling of a non-magnetic material such as glass, and allows suppression of the bubble generation within such non-magnetic material.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 3 is a schematic enlarged view showing a constitution of a parallel groove and the peripheral portion thereof shown in FIG. 2;

FIG. 4 is a schematic sectional view showing a constitution of a parallel groove shown in FIG. 2;

DESCRIPTION OF THE PREFERRED EMBODIMENT

Preferred embodiments of the present invention will be explained hereinafter referring to the attached drawings.

It should now be noted that although the specific embodiments described below, which are most preferable ones of the present invention, will appear with various limitations in view of technical preference, the scope of the present invention is by no means limited thereto unless otherwise the description for limiting the present invention is specifically given.

EXAMPLE 1

Figure 1:
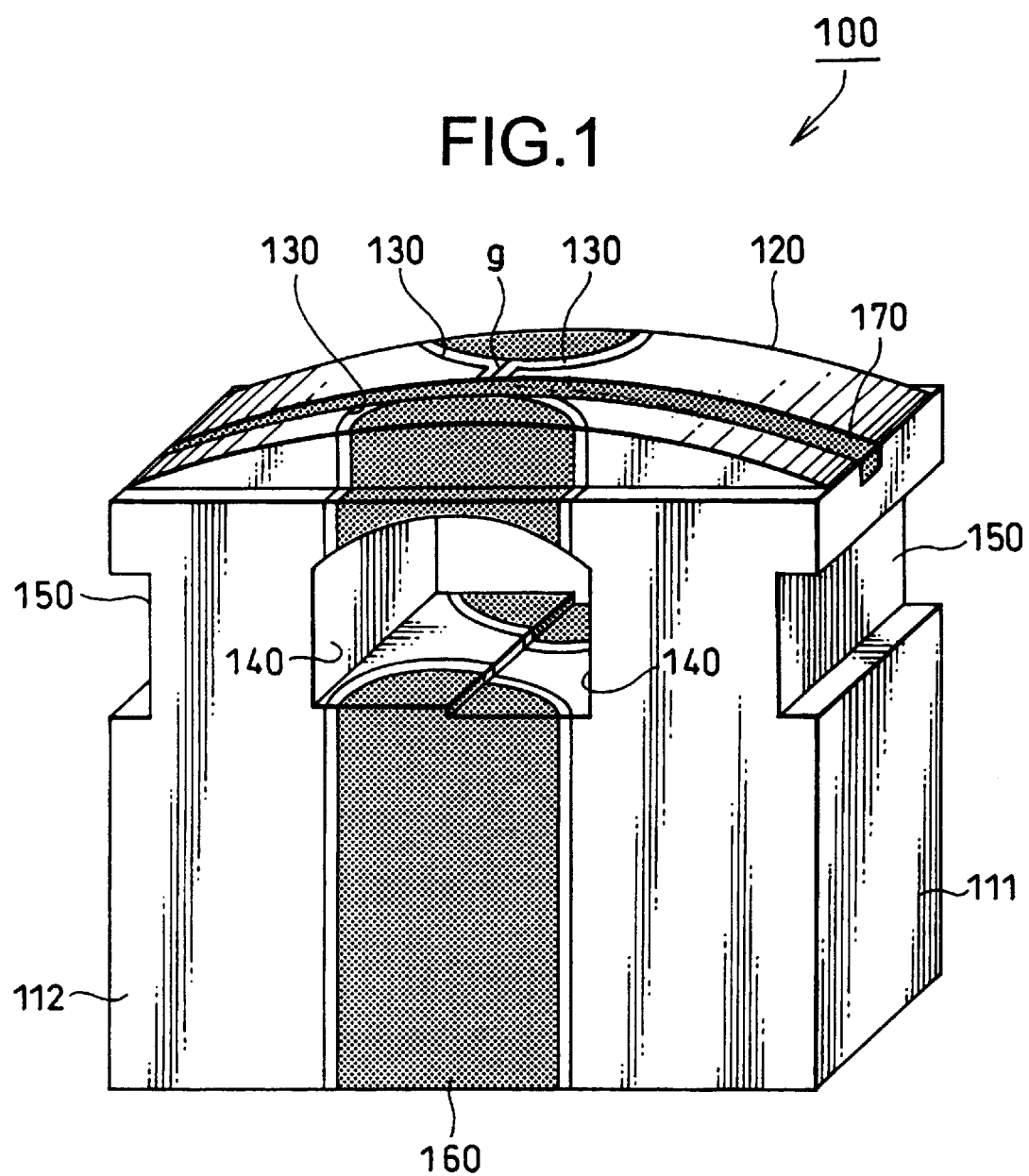
FIG. 1 is a schematic perspective view showing a MIG (metal-in-gap)-type magnetic head according to Example 1 of the present invention.

FIG. 1 is a schematic perspective view showing a MIG (metal-in-gap)-type magnetic head 100 according to Example 1 of the present invention.

The magnetic head 100 is used for recording information signal such as video signal to a magnetic tape 200, or inversely reproducing information signal such as video signal from such magnetic tape 200.

Aiming at obtaining improved image quality or increased memory capacity, recent trends in the recording/reproduction of information signal such as video signal relate to employment of a high-density magnetic recording system in which the recording frequency is raised so as to allow more information signals to be recorded or reproduced.

In order to employ such high-density magnetic recording system, the magnetic tape 200 is selected as of the high coercive force-type, which is typified as a metal tape or a metal evaporated tape.

The metal tape typically comprises a base film and a magnetic layer formed thereon which is obtained by coating a magnetic powder, more specifically a ferromagnetic powder. The metal evaporated tape comprises a base film and a magnetic layer formed thereon which is obtained by directly vapor-depositing a ferromagnetic metal material.

The MIG-type magnetic head 100 shown in FIG. 1 is used for the recording/reproduction of an information signal such as a video signal to or from such high coercive force-type magnetic tape 200, where the MIG-type magnetic head 100 is composed as follows.

That is, the MIG-type magnetic head 100 comprises two magnetic core halves 111 and 112 joined with each other, which are made of an oxide-base soft magnetic material such as Mn—Zn ferrite.

These magnetic core halves 111 and 112 are integrated by joining such as glass fusion or low-temperature thermal diffusion bonding based on mutual thermal diffusion of noble metals. The magnetic core halves 111 and 112 to be integrated by joining respectively have coil winding grooves 140, 140 and winding guide grooves 150, 150 respectively corresponded thereto as shown in FIG. 1.

On the top surface of the magnetic core halves 111, 112 abutted with each other, a slide-contact plane 120 on which the magnetic tape 200 slides is formed.

Figure 2:
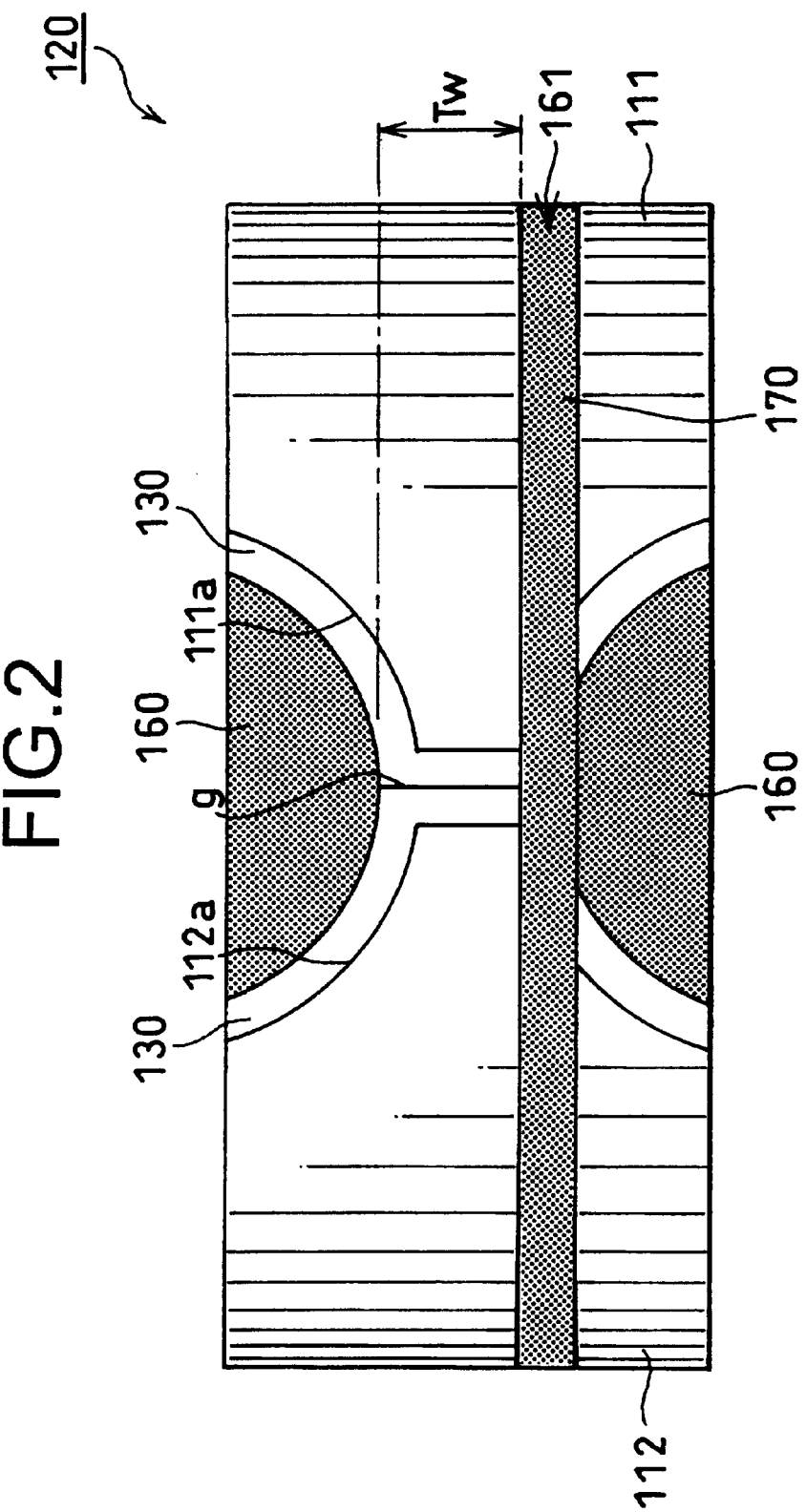
FIG. 2 is a schematic plan view showing the MIG-type magnetic head shown in FIG. 1.

A plan view of the slide-contact plane 120 is shown in FIG. 2. As shown in this figure, the magnetic core halves 111 and 112 have track width limiting grooves 111a and 112a, respectively, in which a nitrogen-doped magnetic alloy film 130 is provided in a predetermined thickness as shown in FIGS. 1 and 2.

The nitrogen-doped magnetic alloy film 130 is provided to form a magnetic circuit between the magnetic gap g described later and a coil wound on the coil winding groove 140. In this Example, the nitrogen-doped magnetic alloy film 130 is mainly made, for example, of Fe, Ru, Ga, Si or Ta, which is doped with N.

Forming such nitrogen-doped magnetic alloy film 130 in the track width limiting grooves 111a and 112a of the magnetic core halves 111 and 112 requires sputtering process using Ar and $N_2$ (nitrogen gas).

The nitrogen-doped magnetic alloy film 130 thus formed tends to release $N_2$ (nitrogen gas) when heated at high temperatures since $N_2$ (nitrogen gas) is employed in the film formation process therefor.

The nitrogen-doped magnetic alloy films 130, 130 formed on the magnetic core halves 111, 112 are abutted with each other with a small distance as shown in FIG. 2 while being interposed by a gap spacer (not shown) made of $SiO_2$ or the like, to thereby form the magnetic gap g. Semicircular portions placed on the outer portions of the nitrogen-doped magnetic film 130 composing the magnetic gap g shown in FIG. 2 are typically filled with a glass 160.

On the slide-contact plane 120 of the thus-composed, MIG-type magnetic head 100 is provided with a parallel groove 170 as a groove portion as shown in FIGS. 1 and 2.

The parallel groove 170 is provided at one end of the track width Tw of the magnetic gap g, which is shown in the lower end in FIG. 2, approximately in parallel to the moving direction of the magnetic tape 200.

Figure 13:
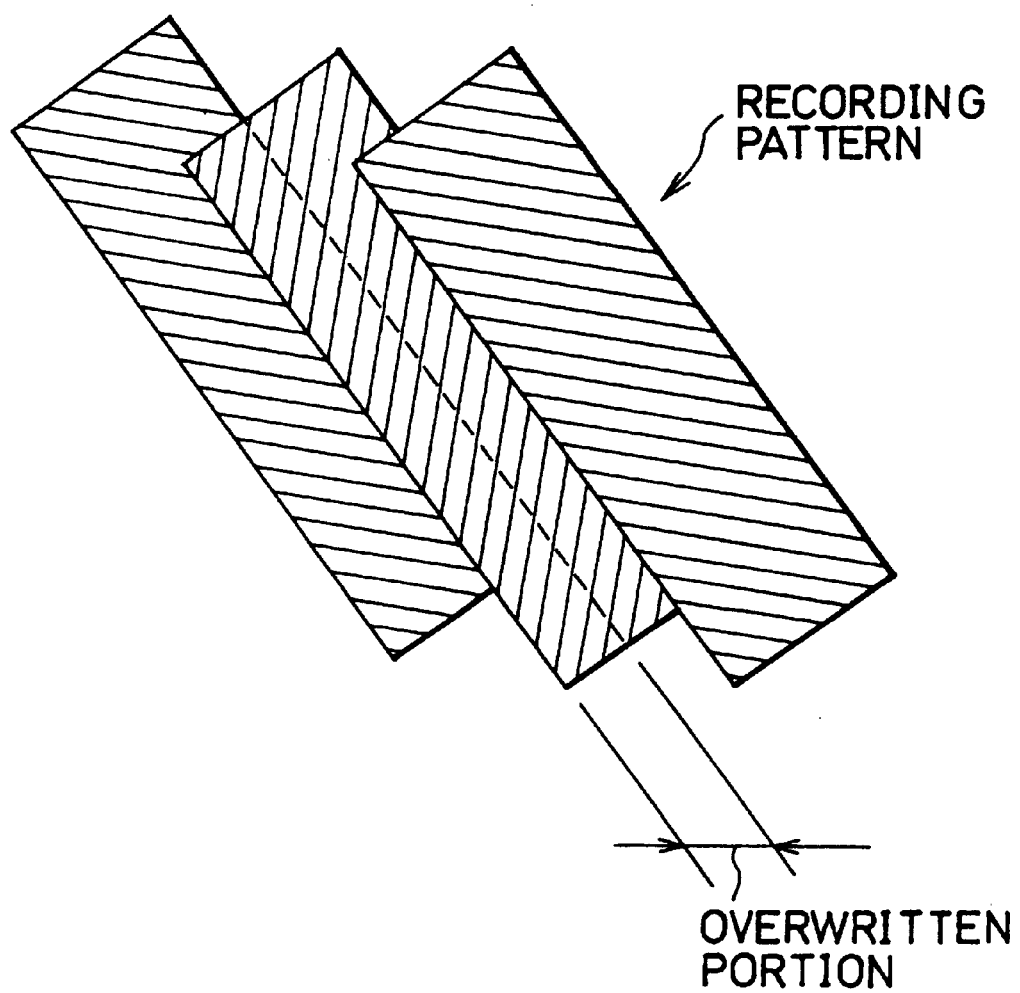
FIG. 13 is a chart for explaining the overwrite system.

The recording system on the magnetic tape 200 using such-composed MIG-type magnetic head 100 refers to the overwrite system in which information signals such as video signals are overwritten as shown in FIG. 13.

The parallel groove 170 is formed so that the trace of which falls within such overwritten portion.

Providing the parallel groove 170 on one end of the magnetic gap g corresponding with the side of the overwriting can prevent the generation of unnecessary leakage flux from such end even if relative misalignment or sagging should occur in the nitrogen-doped magnetic alloy films 130, 130 formed on the magnetic core halves 111, 112 on one end of the magnetic gap g.

As described in the above, the parallel groove 170 formed in the slide-contact plane 120 of the MIG-type magnetic head 100 is finally filled, for example, with a highly weatherproof glass 161 as shown in FIG. 2.

It should now be noted that before being filled with such highly weatherproof glass 161, the parallel groove 170 will have formed thereon a non-magnetic oxide film 180 and a chromium (Cr) film 190 described below.

Specifically, the films are formed as shown in FIG. 3 which shows a partial schematic enlarged view of the parallel groove 170 shown in FIG. 2.

As shown in FIG. 3, the parallel groove will have first formed thereon the non-magnetic oxide film 180, which can be made of an oxide of Al, Cr, Ti, Si, Ta or Cu, where the description below exemplifies $SiO_2$ and $Al_2O_3$.

That is, for a case that $SiO_2$ or $Al_2O_3$ is used for the non-magnetic oxide film 180, the film is formed so as to have a thickness of 0.18 $\mu$m. The thickness is now preferably selected as 0.1 $\mu$m or above since the thickness less than 0.1 $\mu$m may undesirably allow the highly weatherproof glass 161 to react with the magnetic alloy film 130 as described later, to thereby generate bubbles within the highly weatherproof glass 161.

After the non-magnetic oxide film 180 is formed on the inner surface of the parallel groove 170, the chromium (Cr) film 190 is formed thereon in a thickness of, for example, 0.02 $\mu$m. The thickness is now not limited to 0.02 $\mu$m and is allowable if selected within a range from 0.01 $\mu$m to 0.1 $\mu$m.

Using a titanium oxide film in place of the Cr film 190 undesirably results in crystal deposition at the boundary with the glass due to the reaction, and using an Au film is not practical since the film has only a limited wettability with the glass to thereby prevent smooth flow of the glass.

The thickness of the Cr film 190 of 0.01 µm or below is not preferable, since such Cr film 190 may be corroded through reaction thereof with the highly weatherproof glass 161 during the filling described later. The thickness exceeding 0.1 µm is again not preferable, since such thick Cr film 190 will be degraded in the transparency, and will interfere the depth control of the magnetic gap unless otherwise confirmable therethrough.

FIG. 4 is a sectional view in the depth direction of the parallel groove 170 showing such state in which the non-magnetic oxide film 180 and the chromium (Cr) film 190 are formed on the inner surface of the parallel groove 170.

Upon completion of the formation of such non-magnetic film 180 and the chromium (Cr) film 190 on the inner surface of the parallel groove 170, such groove is to be further filled with the highly weatherproof glass 161.

More specifically, the highly weatherproof glass 161 is filled at a filling temperature of 520° C. over 2 hours. An atmosphere employed herein is such that mainly containing nitrogen ($N_2$) gas added with oxygen gas, where a typical flow rate of nitrogen gas is 2 litters/minute in which 50 ppm of oxygen gas is contained.

The highly weatherproof glass 161 is filled into the parallel groove 170 under such atmosphere, in which the Cr film 190 is already provided on the inner surface of the parallel groove 170 so that the highly weatherproof glass 161 is to be fed thereon. The Cr film 190 is, however, a metal film having only a poor wettability with the glass, so that the glass 161 cannot generally flow smoothly thereon. On the contrary, according to this Example, the highly weatherproof glass 161 is filled under the inert gas atmosphere containing oxygen, which improves the wettability of the Cr film 190 with the glass and allows smooth filling of the highly weatherproof glass 161 in the parallel groove 170.

Another advantage of this Example resides in that the reaction between the highly weatherproof glass 161 and the nitrogen-doped magnetic alloy film 130 is avoidable even when such highly weatherproof glass 161 is filled into the parallel groove 170 at a temperature as high as 520° C., since the non-magnetic oxide film 180 is previously formed on the inner surface of the parallel groove 170.

In more detail, the nitrogen-doped magnetic alloy film 130 is formed by sputtering using Ar and $N_2$ gases as described in the above, and thus can release $N_2$ gas affected by the high temperature of the highly weatherproof glass 161. A portion of the nitrogen-doped magnetic alloy film 130 exposed in the parallel groove 170 is however opposed with the highly weatherproof glass 161 while being interposed with the non-magnetic oxide film 180, so that the released $N_2$ gas is not entrained in the highly weatherproof glass 161 which effectively prevents bubbles from being entrained in the highly weatherproof glass 161.

For a case where the non-magnetic oxide film 180 is filled into the parallel groove 170 by sputtering and thus contains therein rare gas ions, the rare gas may be released from such non-magnetic oxide film 180 affected by the temperature of the highly weatherproof glass 161 to thereby form bubbles therein. Now according to this Example, the non-magnetic oxide film 180 has formed thereon the Cr film 190 which effectively blocks such released rare gas to thereby prevent the bubble formation within the highly weatherproof glass 161.

More specifically, the present inventors made a comparative study as described below. In one example, an $SiO_2$ or $Al_2O_3$ film of 0.18 µm thick, as the non-magnetic oxide film 180, was formed on the inner surface of the parallel groove 170, the Cr film 190 of 0.02 µm thick was formed thereon, and the highly weatherproof glass 161 was then filled into the parallel groove 170 at the filling temperature of 520° C. over 2 hours.

In a comparative example, the highly weatherproof glass 161 was filled within the parallel groove 170 having no non-magnetic oxide film 180 and Cr film 190 at the filling temperature of 520° C. over 2 hours.

The atmosphere for such filling is such that mainly containing nitrogen ($N_2$) gas added with oxygen gas, where a typical flow rate of nitrogen gas is 2 litters/minute in which 50 ppm of oxygen gas is contained.

In a case of the comparative example, the highly weatherproof glass 161 filled in the parallel groove 170 without being interposed with the non-magnetic oxide film 180 and the Cr film 190 had bubbles formed therein at a probability of 90 to 100% due to the reaction with the nitrogen-doped magnetic alloy film 130. On the other hand, the highly weatherproof glass 161 filled in the parallel groove 170 while being interposed with the non-magnetic oxide film 180 and the Cr film 190 did not have the bubbles formed therein.

As described in the above, this Example can completely prevent the bubbles from being generated for example in the vicinity of the nitrogen-added magnetic alloy film 130 in the parallel groove 170 or along the magnetic core halves 111, 112. This successfully prevent magnetic powder on the magnetic tape 200 from being caught in the bubbles to thereby cause clogging when the magnetic tape 200 runs on the slide-contact plane 120 of the MIG-type magnetic head 100.

The bubble generation can successfully be avoidable in particular also for a case of using the highly weatherproof glass 161 in order to ensure the reliability of the MIG-type magnetic head 100.

The conventional process suffers from a problem that using the highly weatherproof glass 161 requires a temperature of 540° C. or above for the filling thereof into the parallel groove 170, otherwise such glass 161 will not flow. On the contrary, according to this Example, the filling is carried out under an inert gas atmosphere containing oxygen, so that the chromium film 190 in the parallel groove 170 can exhibit a sufficient wettability to the highly weatherproof glass 161 to thereby allow such glass to be smoothly filled therein at a temperature as low as 520° C.

The filling of the highly weatherproof glass 161 at a temperature as low as 520° C. is advantageous also in that successfully suppressing the generation of deposition which has previously been observed. This significantly improves the yield ratio in the production of the MIG-type magnetic head 100.

The MIG-type magnetic head 100 shown in FIG. 1 is obtained by forming the parallel groove 170 on the slide-contact plane 120 as described in the above, and further by undergoing other process steps described below.

Figure 5A:
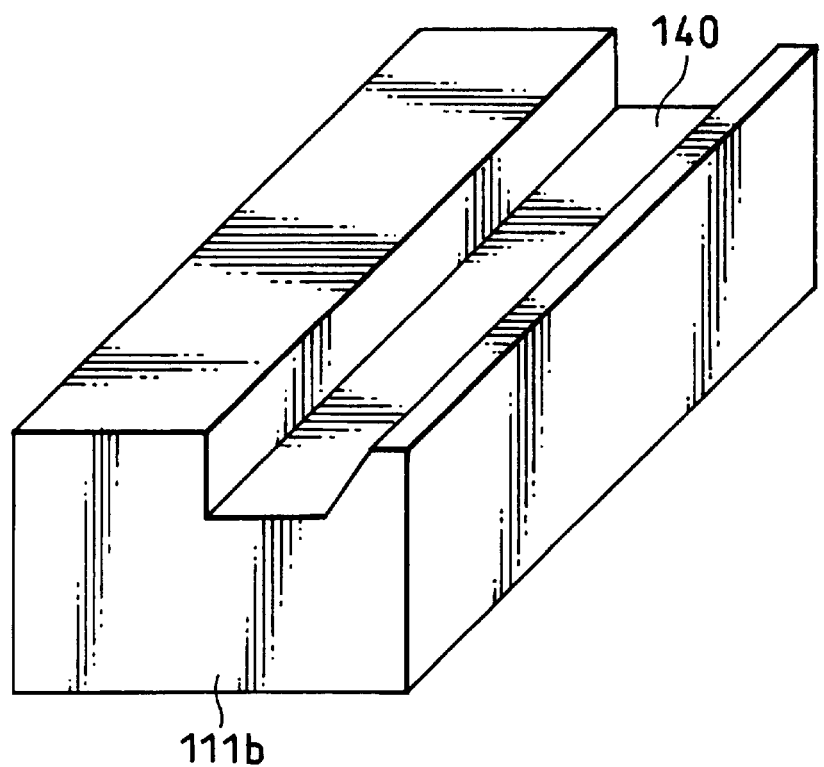
FIGS. 5A and 5B are a schematic perspective views showing a process step for fabricating the MIG-type magnetic head shown in FIG. 1.
Figure 5B:
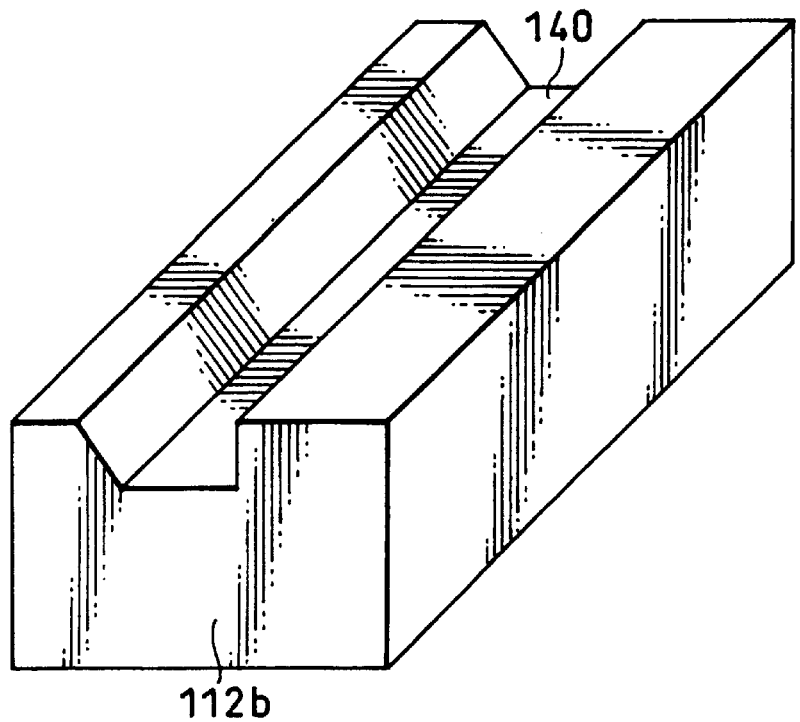

First as shown in FIGS. 5A and 5B, two magnetic core half blocks 111b and 112b made of an Mn—Zn-base ferritic soft magnetic material, finally yield the magnetic core halves 111 and 112, were processed using a grinding stone under grinding water flow. Next, coil winding grooves 140, 140 for limiting the gap depth of the magnetic gap g are individually formed along the longitudinal direction of the magnetic core half blocks 111b and 112b using a grinding stone under grinding water flow.

Figure 6A:
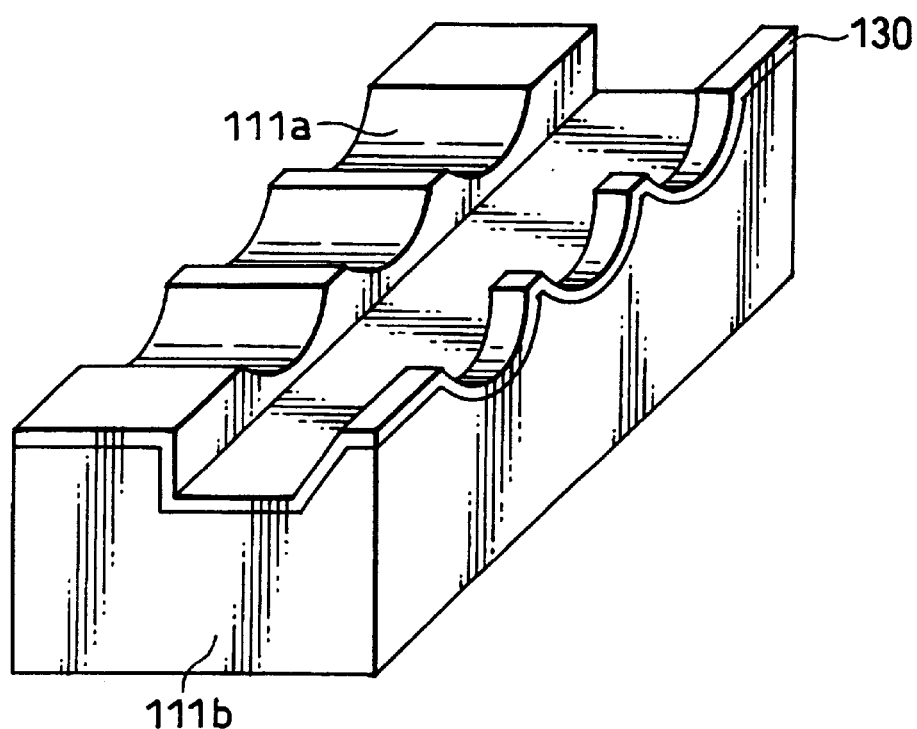
FIGS. 6A and 6B are a schematic perspective views showing a process step as continued from FIG. 5.
Figure 6B:
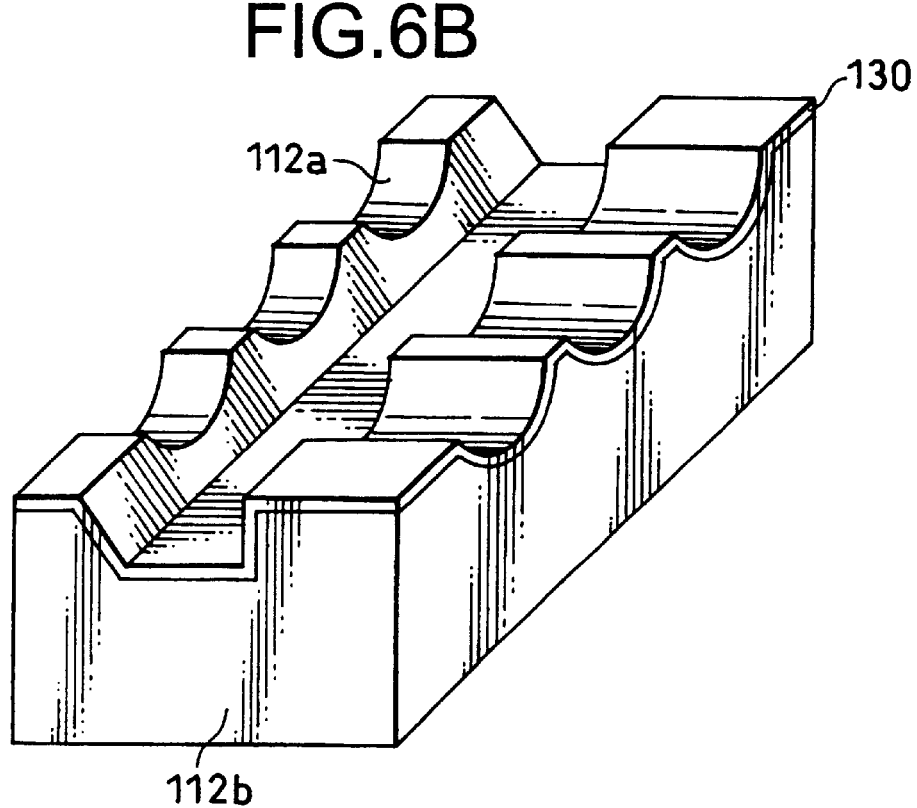

Next, as shown in FIGS. 6A and 6B, track width limiting grooves 111a and 112a are individually formed along the transverse direction of the magnetic core half blocks 111b and 112b using a grinding stone under grinding water flow, and the obtained track width limiting grooves 111a and 112a are then mirror-polished so as attain a surface roughness of approximately 20 to 100 Å, the nitrogen-doped magnetic alloy film 130 is formed by the sputtering process, and further thereon the gap material layer (not shown) is formed.

Figure 7:
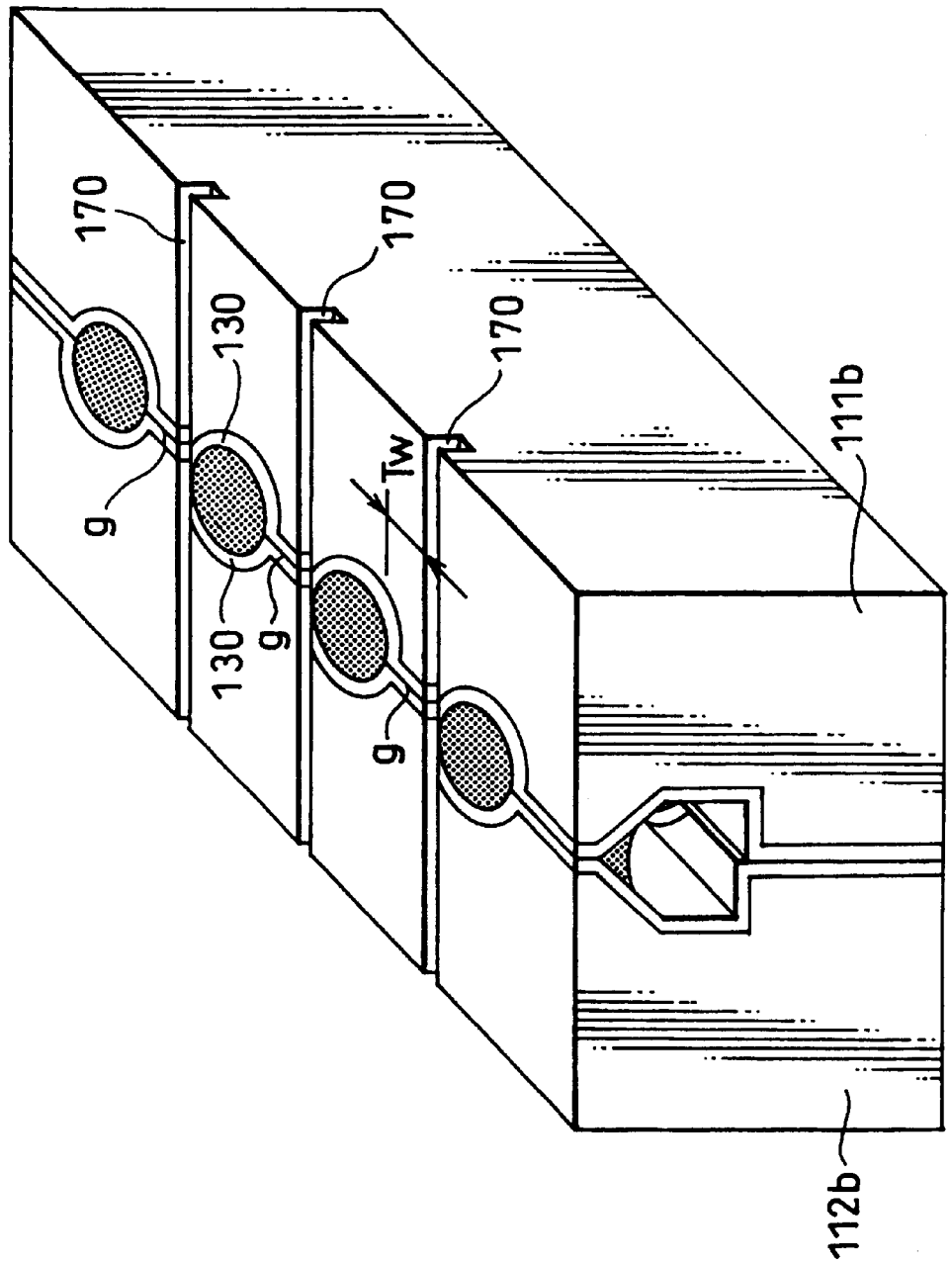
FIG. 7 is a schematic perspective view showing a process step as continued from FIG. 6.

Next, as shown in FIG. 7, both magnetic core half blocks 111b and 112b are abutted with each other and integrated by joining such as glass fusion or low-temperature thermal diffusion bonding based on mutual thermal diffusion of noble metals, to thereby form a single magnetic core block. The magnetic gap g is concomitantly formed in this process. The magnetic core block is then notched using grinding water and a grinding stone in the transverse direction thereof to produce the parallel groove 170 aligned at one end of the magnetic gap g so as to limit the track width Tw thereof to a predetermined value.

Figure 8:
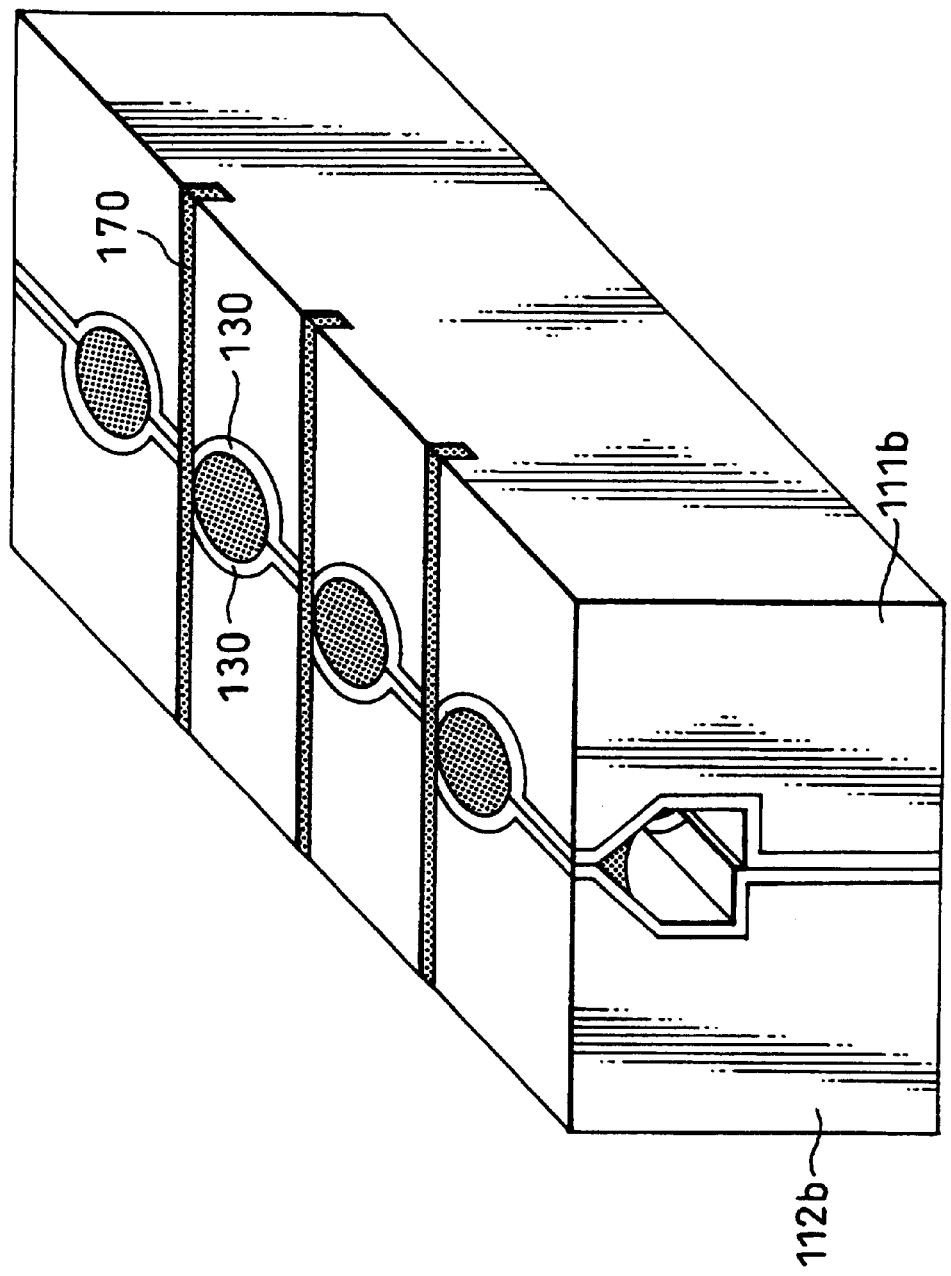
FIG. 8 is a schematic perspective view showing a process step as continued from FIG. 7.

Next, as shown in FIG. 8, the foregoing non-magnetic oxide film 180 is formed on the entire inner surface of the parallel groove 170, which is followed by the formation of the nitrogen-doped magnetic alloy film 130 and the foregoing highly weatherproof glass 161 in this order.

Figure 9:
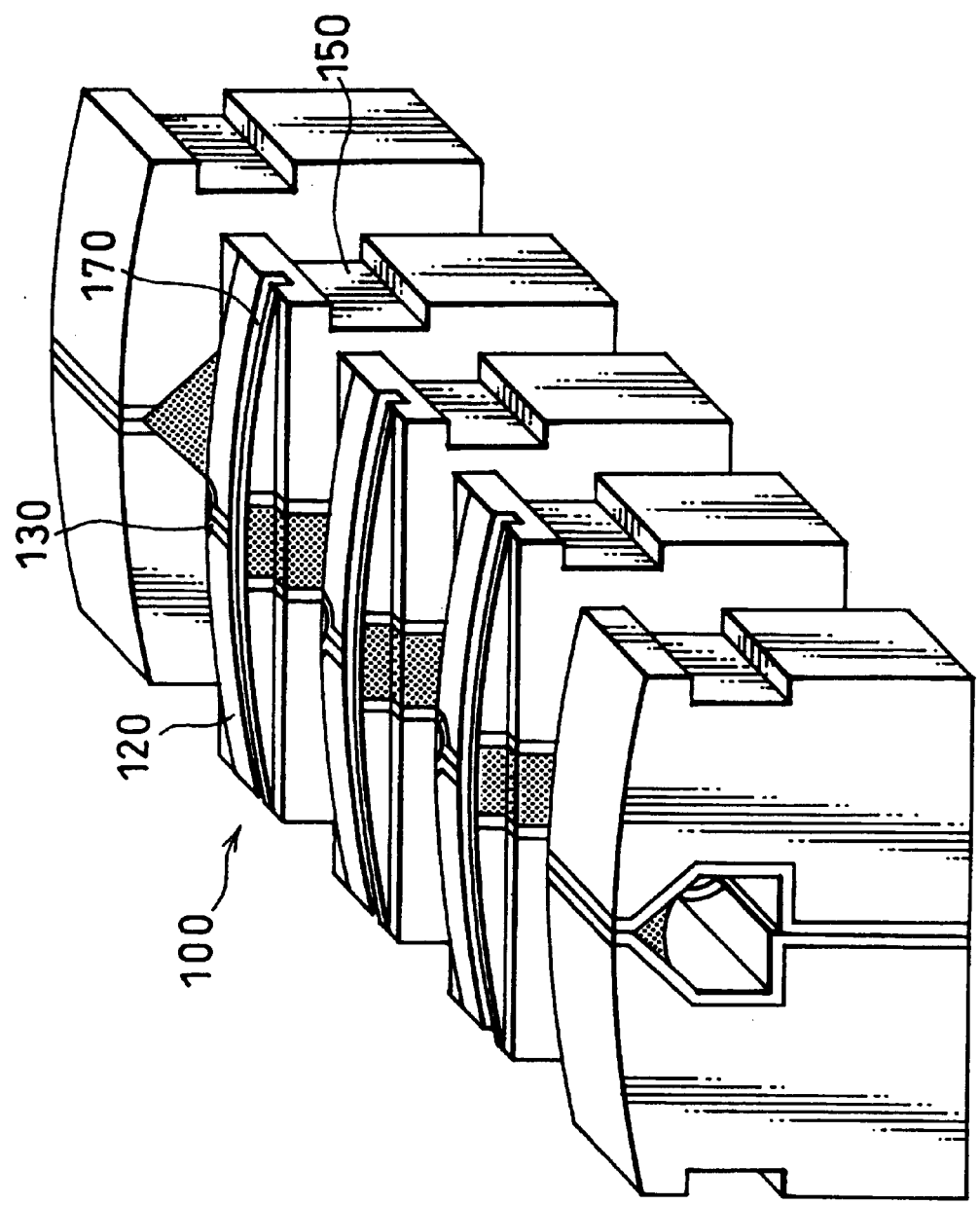
FIG. 9 is a schematic perspective view showing a process step as continued from FIG. 8.

Thereafter as shown in FIG. 9, the plane of the magnetic core block having the magnetic gap g exposed thereon is subjected to cylindrical lapping to a predetermined depth to thereby produce a slide-contact plane 120 having a predetermined curvature. The magnetic core block is further subjected to grinding using grinding water and a grinding stone to thereby form the winding guide groove 150, and then subjected to cutting process to thereby produce a plurality of the MIG-type magnetic heads 100.

When the MIG-type magnetic head 100 according to this Example is that for the azimuth recording system, a predetermined azimuth angle will be provided between the moving direction of the magnetic tape 200 and the magnetic gap g on the slide-contact plane 120.

EXAMPLE 2

An MIG-type magnetic head 300 according to Example 2 will be described hereinafter. Since the MIG-type magnetic head 300 according to this Example is similar in many aspects to the MIG-type magnetic head 100 according to the foregoing Example 1, so that portions common to the both will have the same reference numerals while the detailed descriptions thereof being omitted, and so that the following description focuses the points different from those in Example 1.

The MIG-type magnetic head 300 of this Example differs from the MIG-type magnetic head 100 of Example 1 in that having only a chromium oxide film on the inner surface of a parallel groove 370 in a thickness of 0.1 μm or above.

On such chromium oxide film, the highly weatherproof glass 161 will be filled under an $N_2$ gas atmosphere or under an oxygen-added $N_2$ gas atmosphere.

Such process is advantageous in that the highly weatherproof glass 161 can flow smoothly even under an oxygen-free $N_2$ gas atmosphere since the chromium oxide film as exhibits a sufficient wettability with the glass which is a feature of an oxide film.

The thickness of the chromium oxide film is preferably 0.1 μm or above, where the thinner the better.

Such constitution of the MIG-type magnetic head 300 of this Example having the chromium oxide film formed in the parallel groove 170 is advantageous in that rare gas released from the nitrogen-doped magnetic alloy film 130 is blocked by such chromium oxide film to thereby prevent such rare gas from being entrained in the highly weatherproof glass 161 to thereby generate undesirable bubbles.

More specifically, the present inventors made a comparative study as described below. In one example, a chromium oxide film of 0.1 μm thick was formed on the inner surface of the parallel groove 170, and the highly weatherproof glass 161 was then filled into the parallel groove 170 at the filling temperature of 520° C. over 2 hours.

In a comparative example, the highly weatherproof glass 161 was filled at the filling temperature of 520° C. over 2 hours into the parallel groove 170 having an oxide film other than chromium oxide film previously formed.

Both cases employed a filling atmosphere mainly containing nitrogen ($N_2$) gas added with oxygen gas, where a typical flow rate of nitrogen gas is 2 litters/minute in which 50 ppm of oxygen gas is contained.

In a case of the comparative example, the highly weatherproof glass 161 filled in the parallel groove 170 having an oxide film other than chromium oxide film had bubbles formed therein at a probability of 7 to 35% due to the reaction with the nitrogen-doped magnetic alloy film 130. On the other hand, the highly weatherproof glass 161 filled in the parallel groove 170 while being interposed with the chromium oxide film had the bubbles formed therein only at a probability of approximately 2%.

EXAMPLE 3

Figure 10:
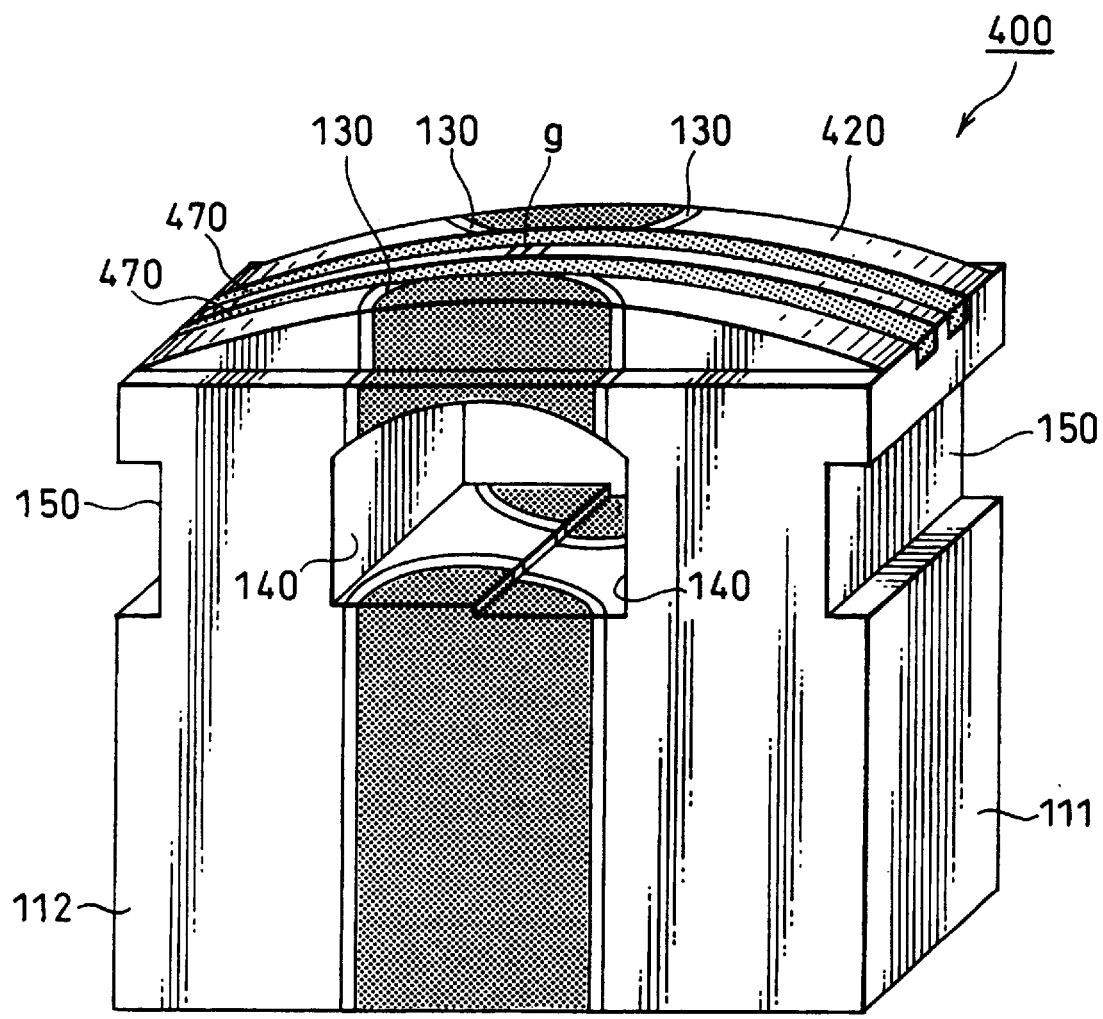
FIG. 10 is a schematic perspective view showing a MIG-type magnetic head according to Example 3 of the present invention.
Figure 11:
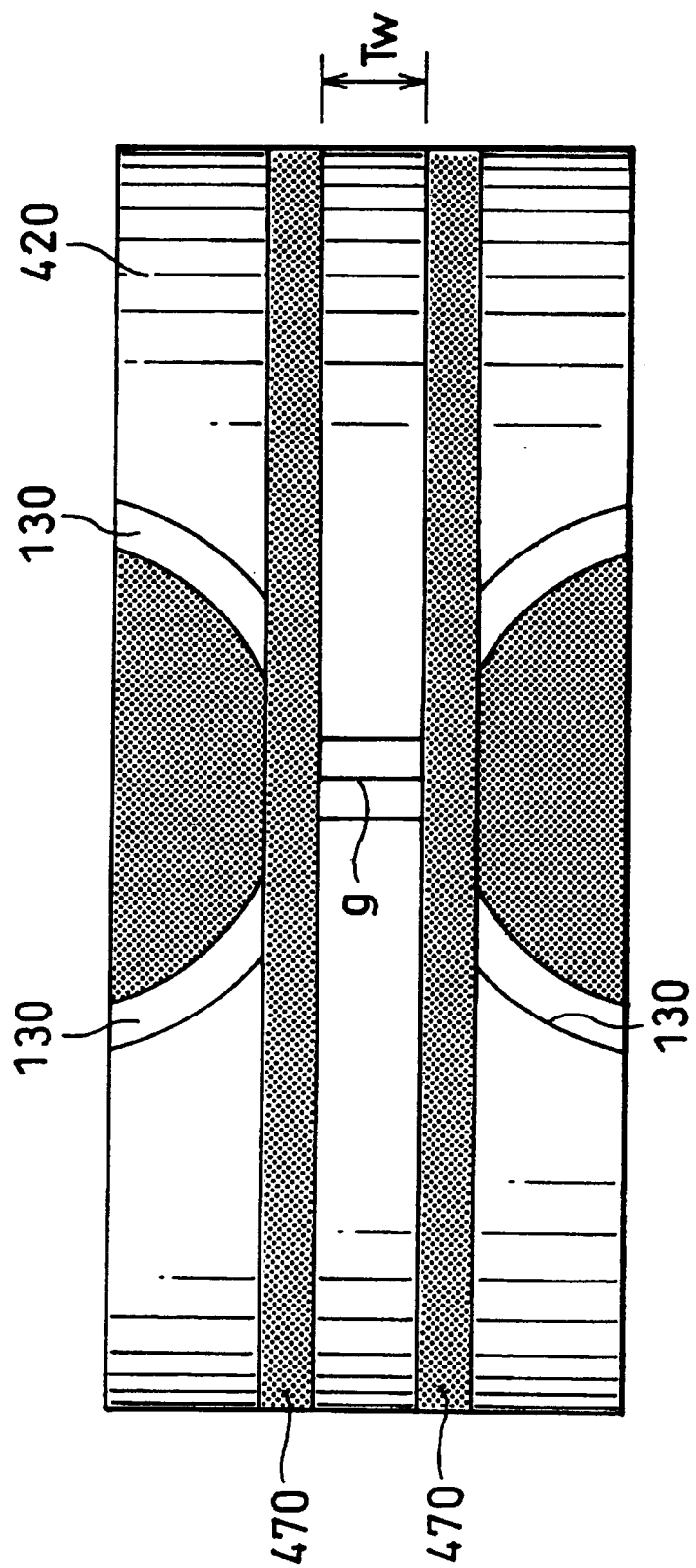
FIG. 11 is a schematic plan view showing the MIG-type magnetic head shown in FIG. 10.
Figure 12:
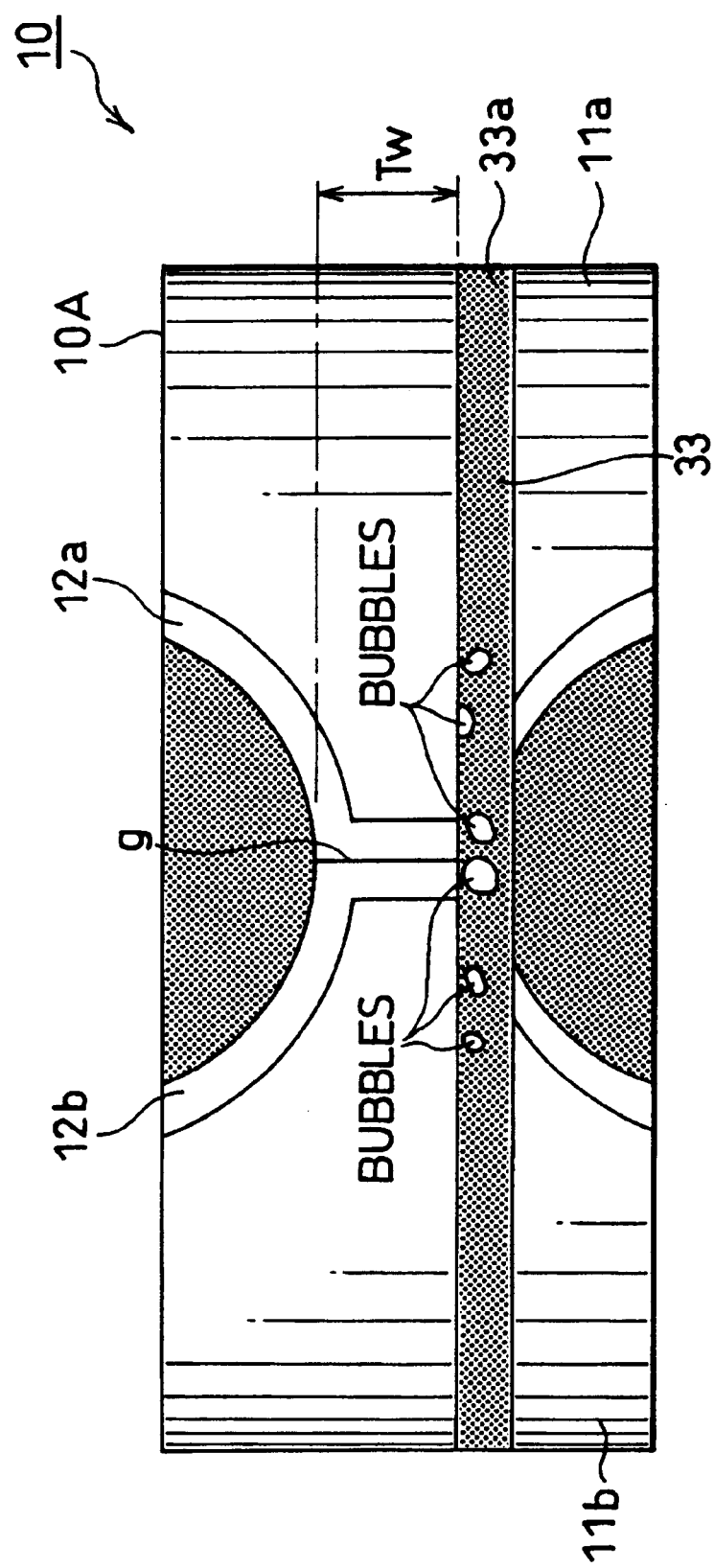
FIG. 12 is a schematic plan view showing a slide-contact plane of a conventional magnetic head.

FIG. 10 is a schematic perspective view showing a MIG-type magnetic head 400 according to Example 3, and FIG. 11 is a schematic plan view showing the slide-contact plane of the MIG-type magnetic head 400 shown in FIG. 10.

Since the MIG-type magnetic head 400 according to this Example is similar in many aspects to the MIG-type magnetic head 100 according to the foregoing Example 1, so that portions common to the both will have the same reference numerals while the detailed descriptions thereof being omitted, and so that the following description focuses the points different from those in Example 1.

The MIG-type magnetic head 400 according to this Example is such that being typically used for so-called return writing system, so that parallel grooves 470 are formed at both ends of the magnetic gap g as shown in FIG. 11, unlike the parallel groove 170 in Example 1.

Providing the parallel grooves 470 on both ends of the magnetic gap g can effectively prevent unnecessary leakage magnetic field from such both ends. This allows recording and reproducing information signals to or from the magnetic tape based on the return writing recording system without disturbing the recording pattern on the magnetic tape running on the slide-contact plane.

The parallel groove 470 now has the non-magnetic oxide film 180 and the chromium film 170 formed therein similarly to the case in Example 1. This successfully prevent bubbles from being formed within the highly weatherproof glass 161 due to reaction with the nitrogen-doped magnetic alloy film 130 or rare gas occluded in the non-magnetic oxide film 180 during the filling process of such highly weatherproof glass 161 into the parallel groove 470, which ensures a high quality of the MIG-type magnetic head 400 having the slide-contact plane 420 not causative of clogging with magnetic powder during the tape run.

Although the invention has been described in its preferred form with a certain degree of particularity, obviously many changes and variations are possible therein. It is therefore to be understood that the present invention may be practiced otherwise than as specifically described herein without departing from the scope and the sprit thereof.

That is, the constitutions of the foregoing Examples are partially omissible or may be altered to an arbitrary combination of other constitutions. For example, it is also allowable to form the chromium oxide film described in Example 2 in the parallel groove 470 in place of the foregoing non-magnetic oxide film 180 and the chromium film 190.

What is claimed is:

1. A magnetic head comprising:
    a slide-contact plane with which a magnetic recording medium comes into contact, which is provided on a magnetic core;
    a magnetic gap provided in said slide-contact plane by forming thereon at least a magnetic film;
    a groove portion provided at one end or each of both ends of said magnetic gap so as to be aligned approximately in parallel to a moving direction of the magnetic recording medium; and
    a non-magnetic material provided in said groove portion; wherein
    said groove portion has a non-magnetic oxide film and a chromium film formed on an inner surface thereof and has said non-magnetic material formed on the chromium film so as to fill said groove portion.

2. The magnetic head as claimed in claim 1, wherein said non-magnetic oxide film has a thickness of 0.1 $\mu$m or above, and said chromium film has a thickness of 0.01 to 0.1 $\mu$m.

3. A magnetic head comprising:
    a slide-contact plane with which a magnetic recording medium comes into contact, which is provided on a magnetic core;
    a magnetic gap provided in said slide-contact plane by forming thereon at least a magnetic film;
    a groove portion provided at one end or each of both ends of said magnetic gap so as to be aligned approximately in parallel to a moving direction of the magnetic recording medium; and
    a non-magnetic material provided in said groove portion; wherein
    said groove portion has a chromium oxide film formed on an inner surface thereof and has said non-magnetic material formed on the chromium oxide film so as to fill said groove portion.

4. The magnetic head as claimed in claim 3, wherein said chromium oxide film has a thickness of 0.1 $\mu$m or above.

* * * * *